United States Patent [19]
Reaves

[11] Patent Number: 5,368,728
[45] Date of Patent: Nov. 29, 1994

[54] PAINT STRAINER ASSEMBLY

[75] Inventor: Paul H. Reaves, Durham, N.C.

[73] Assignee: Reaves & Company, Inc., Durham, N.C.

[21] Appl. No.: 252,438

[22] Filed: Jun. 1, 1994

[51] Int. Cl.$^5$ .......................................... B01D 29/085
[52] U.S. Cl. .................................... 210/232; 210/474; 210/497.2
[58] Field of Search ............... 210/232, 469, 474, 477, 210/482, 497.2

[56] References Cited

U.S. PATENT DOCUMENTS

| | | | |
|---|---|---|---|
| 4,025,435 | 5/1977 | Shea | 210/469 |
| 4,622,146 | 11/1986 | O'Brien | 210/474 |
| 4,804,470 | 2/1989 | Calvillo et al. | 210/474 |
| 4,946,591 | 8/1990 | Mealey | 210/497.2 |
| 5,078,872 | 1/1992 | Durant et al. | 210/477 |
| 5,186,828 | 2/1993 | Mankin | 210/474 |
| 5,221,475 | 6/1993 | Mealey et al. | 210/497.2 |

Primary Examiner—Robert A. Dawson
Assistant Examiner—W. L. Walker
Attorney, Agent, or Firm—Olive & Olive

[57] ABSTRACT

A paint strainer assembly for straining liquid paint into a paint container comprises an upwardly extending continuous closed wall support with upper and lower openings defined by a plurality of wall panels hingedly interconnected by elongate hinging portions. A replaceable mesh strainer bag having an elasticized periphery is removably contained within a plurality of slots defined by the hinging portions so as to arrange the strainer bag within the assembly for receiving and straining paint into a paint container located therebeneath.

4 Claims, 2 Drawing Sheets

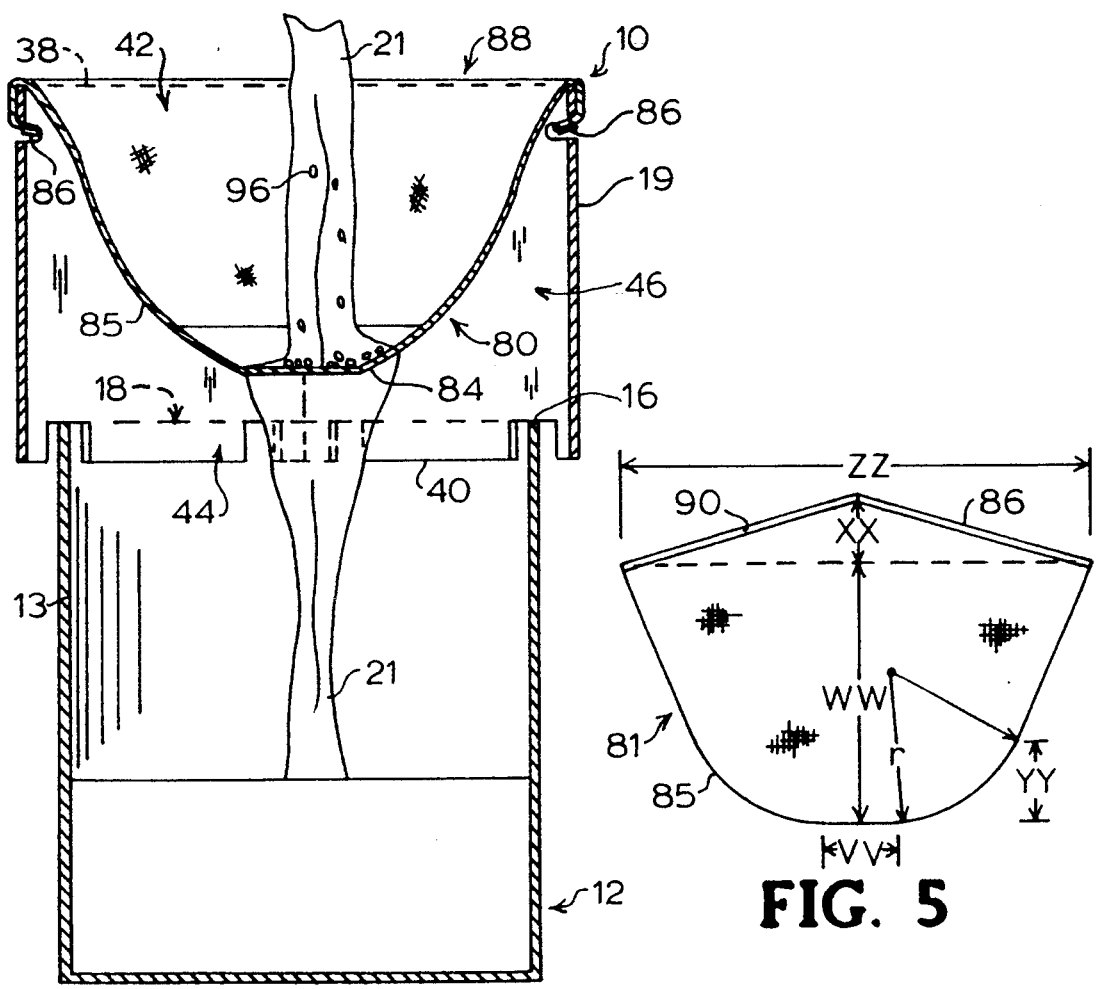
FIG. 2
FIG. 5
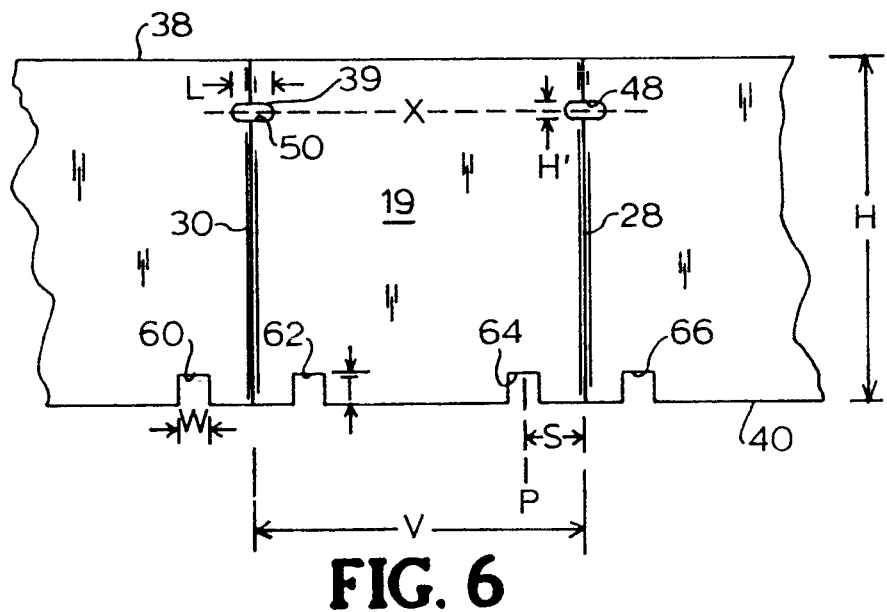
FIG. 6

PAINT STRAINER ASSEMBLY

BACKGROUND OF THE INVENTION

1. Field of the Invention

This invention relates to painting apparatus and particularly to a paint strainer assembly.

2. Description of the Related Art

Liquid paints are made from a variety of ingredients including liquid paint thinner, color pigment, thickening agents and various chemicals for controlling the rate of drying. A number of solid particle ingredients are suspended within the liquid paint. After time, the particles tend to join together and form an aggregate of particles, i.e., lumps. Foreign particles may also be introduced into the liquid paint at the factory, retail store or job-site.

A painter using a paint brush normally attempts to remove any lumps from the paint brush prior to application of the paint to a surface. However, some lumps are not easily seen and removed from the brush and are consequently applied to the surface along with the liquid paint. In this situation, a painter is normally compelled to remove the lumps from the painted surface and re-brush the surface to even the paint coat. The lump removing and re-brushing process requires a painter to spend excess time and effort at a particular job site, and causes a painter much aggravation.

Paint sprayers have become common tools for the paint industry. A paint sprayer typically includes an air compressor, a paint container, a spray gun and a plurality of interconnecting hoses. The spray gun has a nozzle with relatively small apertures. The spray gun apertures are easily clogged with lumps and particulate matter contained within the liquid paint. A clogged gun requires a painter to stop applying paint to a surface and disassemble, clean and reassemble the gun. A painter, of course, prefers that paint not contain lumps.

Traditionally, painters extract lumps from paint by straining the paint through a fine mesh strainer bag. The strainer bag is typically placed over an empty paint container and the paint is poured into the strainer bag. Some strainer bags have an elasticized upper edge which can be fitted over the upper edge of an empty round paint container to hold the bag in place. Paint filters through the fine mesh of the bag and falls into the container. The paint clumps are retained in the strainer bag. The strainer bag is typically thrown away after one use. This straining process is relatively messy and time consuming. As a result, some painters do not strain their paint before use.

An improved paint strainer device described in U.S. Pat. No. 4,804,470 to Calvillo and Lykins, is disposable and relatively clean to use. The '470 patent device, the teachings of which are incorporated herein by reference, has a foldable upwardly extending closed wall support whose upper and lower edges define upper and lower openings respectively. A passageway interconnects the openings. A fine mesh strainer bag used with the '470 patent device has a straight upper edge defining an upper opening. The upper edge of the strainer bag as described in the '470 patent is permanently attached to the upper edge of the wall support. The strainer bag has a closed lower portion that is disposed within the passageway. The wall support is releasably attached along its lower edge to a paint container.

Liquid paint is poured through the upper opening of the '470 patent device and into the closed lower portion of the straining bag. The paint filters through the fine mesh of the strainer bag and falls into the paint container located beneath. The fine mesh prevents lumps from passing with the liquid paint and thus the lumps are extracted from the liquid paint. The '470 patent device may be folded upon itself for the purpose of compressing the remaining liquid paint through the stainer bag.

While the '470 patent device has those advantages recited above, it also has disadvantages. First, attachment of the strainer bag to the support wall during manufacturer is time consuming and costly. Second, the straight upper edge of the strainer bag causes the upper portion of the bag to bunch and gather near the top edge of the support wall thereby providing an opportunity for a painter working nearby to snag the bunched material and cause a paint spillage accident. Third, the mesh strainer bag is permanently attached to the wall support. A permanently attached strainer bag is a problem when straining a large volume of paint or when straining paint having a high concentration of lumps. The fine mesh net of the strainer bag may get clogged before the straining process is complete. As a result, the used '470 patent device must be discarded and a completely new '470 patent device installed to complete the job. It would thus be an improvement in the art if the strainer bag, instead of being permanently attached, could be easily removed from the support wall and a new strainer bag easily attached to the original support wall so as to avoid having to discard the support wall whenever the strainer bag becomes clogged.

Therefore, it is an object of the present invention to produce a strainer assembly that is easy and inexpensive to manufacture.

A further object of the present invention, is to construct a strainer bag shaped such that when removably attached to a support wall of the type described the upper portion of the bag lays neat and flat against the exterior surface of the wall support thus diminishing the chances of a painter working nearby snagging the strainer bag and causing paint spillage.

Another object of the present invention, is to make a strainer device having a mesh strainer bag that is easily attachable and removable from a support wall so that the bag when clogged can be disposed of and the support wall reused with a replacement bag.

Other objects will appear as the description proceeds.

SUMMARY OF THE INVENTION

The improved paint strainer assembly of the present invention is inexpensive to manufacture and provides an improved fine mesh strainer bag which is easily attached and detached from a closed wall support. Thus, a clogged strainer bag may be replaced with a new strainer bag without the need to dispose of the wall support.

The improved paint strainer assembly of the present invention includes a foldable closed wall support having a plurality of side panels interconnected by elongate hinging portions. The wall support also includes upper and lower edges defining respective upper and lower openings between which extends a passageway. Notches adjacent the bottom edge of the wall support receive the top edge of a paint container and thus provide a means for stabilizing the support on the container. A slot is formed in each of the hinging corners immediately below the upper edges of the wall support and which is adapted to receive at its respective corner an expandable perimeter portion of a fine mesh strainer bag thereby providing a secure but releasable attachment of the strainer bag to the wall support at each of its corners. The strainer bag has an upwardly angled upper perimeter edge which is expandable as previously mentioned and a closed bottom portion. The angled upper perimeter edge is expanded and inserted within the slots to provide both a secure and neat appearance and the closed bottom portion is disposed within the previously mentioned passageway for receiving paint for straining therethrough.

BRIEF DESCRIPTION OF THE DRAWINGS

FIG. 2 is a section view of the paint strainer assembly taken along lines 2—2 in FIG. 1.

FIG. 5 is an elevation view of a single section of the strainer bag two of which are paired and secured together to form the strainer bag.

FIG. 6 is an elevation view of a section of the wall support.

DETAILED DESCRIPTION OF THE INVENTION AND PREFERRED EMBODIMENTS THEREOF

Figure 1:
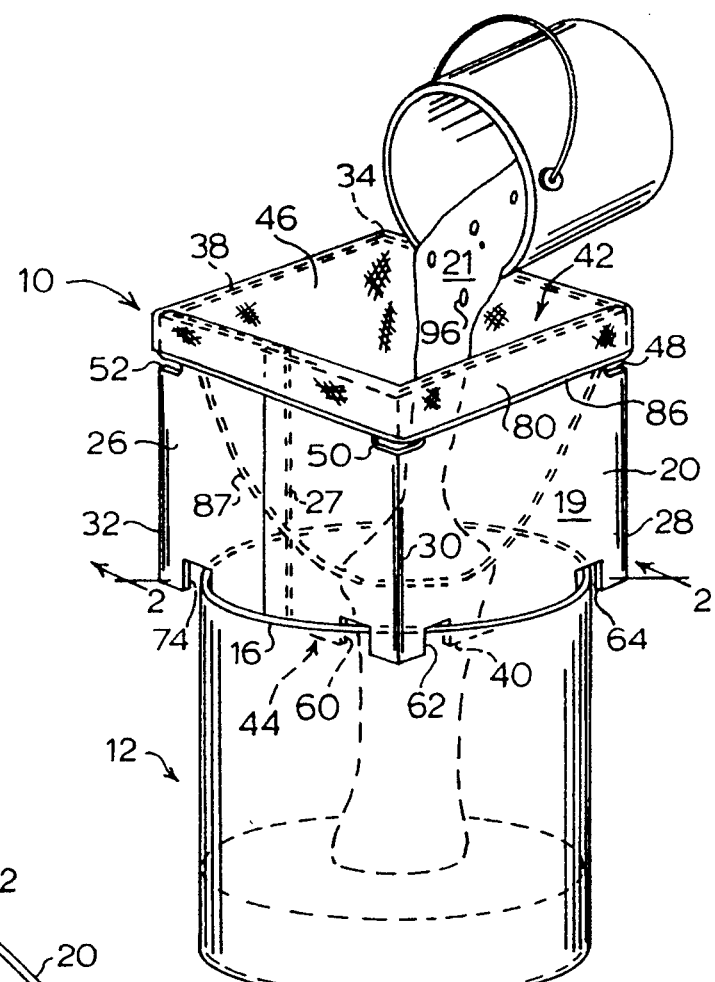
FIG. 1 is a perspective view of a paint strainer assembly made in accordance with a first embodiment of the present invention and shown in use installed on a container.

FIG. 1 illustrates in a perspective view a first embodiment of the paint strainer assembly 10 of the invention as it appears in use mounted on a substantially cylindrical container 12 having a cylindrical wall 13 with an upper edge 16 defining an upper container opening 18 (FIG. 2). An initially empty five-gallon container is used by way of example as container 12.

Paint strainer assembly 10 includes a closed wall support 19 comprising a plurality of elongate hinging corners, 28, 30, 32, 34 (FIG. 3) joining a plurality of side panels 20, 22, 24, 26 such that panels 20 and 22 are joined at corner 28, panels 22 and 24 are joined at corner 34, panels 24 and 26 are joined at corner 32, and panels 26 and 20 are joined at corner 30. In one illustrative example in which the invention paint strainer assembly 10 is assumed to be used on a five-gallon container, each panel has a height H of approximately ten inches and a width V of 9¾ inches (FIG. 6). The closed wall support 19 also includes upper 38 and lower 40 edges defining upper 42 and lower 44 openings respectively. Passageway 46 (FIG. 3) interconnects openings 42, 44. A generally rectangular round ended, groove 48, 50, 52, and 54, not shown, is located at each corner 28, 30, 32, and 34, respectively. Each groove is formed at the corner joint of a respective pair of side panels 22-20, 20-26, 26-24, and 24-22 respectively. The central axis X (FIG. 6) of grooves 48, 50, 52, 54 resides in a common horizontal plane. Each somewhat elliptical shaped groove has a height H' of approximately ⅜ inches and a length L of approximately 1 inch as shown in FIG. 6. The top horizontal edge 39 of each groove is approximately 1⅜ inches below the upper horizontal edge 38.

Figure 3:
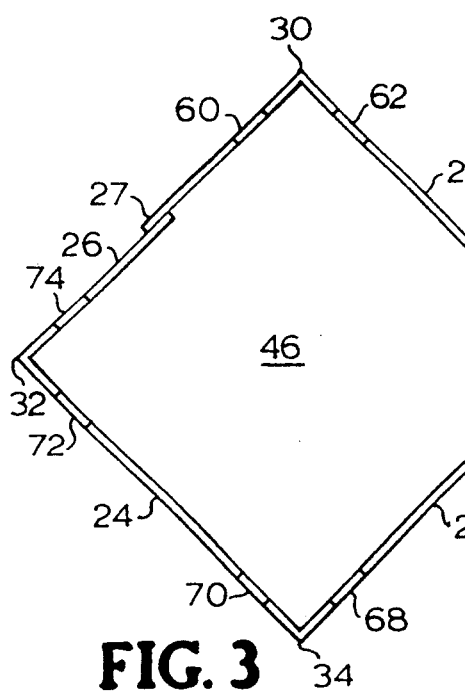
FIG. 3 is a bottom plan view of the wall support of FIG. 1.

As illustrated in FIGS. 1 and 3, a plurality of notches 60, 62, 64, 66, 68, 70, 72, 74 extend upwardly from lower edge 40 and are adapted to receive the upper edge 16 of container 12 for releasable attachment and mounting of strainer assembly 10 thereto. Each notch, in the example being used for illustration, is approximately 1 inch wide W and ⅞ inch tall T and each has a midpoint P spaced a distance approximately 1¾ inch from its immediately adjacent hinging corner (See FIG. 6). The strainer assembly 10 is mounted to the upper edge 16 of paint container 12 such that relatively short portions of wall support 19 extend respectively between notches 60, 62, between 64, 66, between notches 68, 70 and between notches 72, 74 and are located exterior to paint container 11. The relatively larger portions of each side panel 20, 22, 24 and 26 extend between notches 62, 64 and 66, 68 and 70, 72, and 74, 60 respectively and are located within the interior of the paint container 11 as best seen in FIG. 1.

Strainer bag 80 is formed from two substantially identical size and shape sections of a mesh material joined together at their edges. A single section 81 is illustrated in FIG. 5 and is illustrated as having an upwardly angled upper perimeter edge 86 and inwardly tapered outer edge 85. The sections are interconnected at the edges 85 to form a seam 87 (FIG. 1), a closed lower end 84, and a perimeter edge 86 defining an upper opening 88 (FIG. 2). An elasticized periphery portion 90 joins and surrounds perimeter edge 86. In the example being used by way of illustration, the approximate dimensions of the strainer section 81 of FIG. 5 are disclosed in the following Table 1:

| Element | Inches |
| --- | --- |
| r | 6 |
| vv | 4½ |
| ww | 11½ |
| xx | 3½ |
| yy | 3 |
| zz | 22 |

As best illustrated in FIG. 2, the closed end 84 (FIG. 2) of strainer bag 80 when in use is positioned within passageway 46 above lower edge 40 in a position such that seam 87 coincides with two diagonally opposite side corners, e.g. corners 28, 32. The elasticized perimeter edge 86 and periphery portion 90 of strainer bag 80 is draped over upper edge 38 of wall support 19 and inserted into grooves 48 through 54 such that the upper portion of strainer bag 80 adjacent perimeter edge 86 is folded downwardly against exterior portions of panels 20 through 26. The upwardly angled shape of upper perimeter edge 86 and the described manner of positioning seam 87, causes the upper portion of strainer bag 80 to fit tightly and neatly against the exterior portions of panels 20 through 26. Thus, the problem associated with using a strainer bag having a straight upper edge which causes the upper portion of the strainer bag to bunch and gather when mounted to support wall 19 is eliminated which avoids having a bunched and gathered portion which may snag persons or items nearby causing paint spillage or other accidents.

When paint 21 is poured downwardly into the strainer bag 80, as in FIG. 2, the downward pressure of the paint 21 on the upper surface of the closed end 84 of strainer bag 80 causes the edge 86 of the strainer bag to press upward against the top surface of each respective groove 48 through 54 thus causing edge 86 to be firmly held within the grooves during straining of paint 21 through strainer bag 80 into container 12 and during which clumps 96 are retained in the strainer bag 80 for subsequent disposal. Removal of strainer bag 80 from the wall support 19 is easily accomplished by slipping the elasticized perimeter edge 86 and periphery portion 90 outward, upward and away from wall support 19.

Wall support 19, in one illustrative example, is made from a rectangular strip of disposable, substantially rigid, corrugated cardboard having its end edges joined together to form a joint 27 along one of side panels 20 through 26 and intermediate any two adjacent hinging corners 28 through 34 (FIG. 3). Although the end edges of the rectangular strip could be joined at any of the corners 28 through 34, it has been found that joining of the end edges at a position between two of the corners as illustrated in FIG. 3 provides support 19 with extra strength. Wall support 19 is easily collapsible or folded flat by creasing two opposed corners and flattening the remaining opposed corners.

Figure 4:
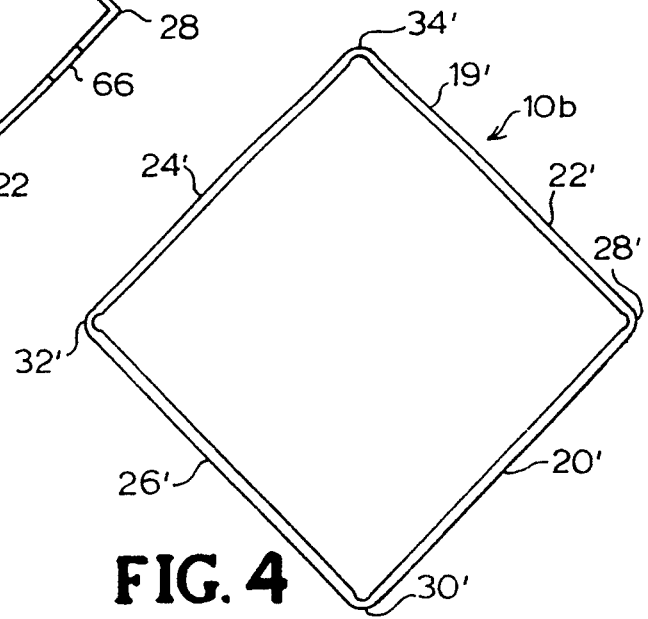
FIG. 4 is a bottom plan view of a wall support according to a second embodiment of the invention.

A bottom view of a second embodiment wall support 19' for the paint strainer assembly 10b of the second embodiment is illustrated in FIG. 4. The second embodiment wall support 19' is essentially the same as that of the first embodiment described above except that an elongate so-called "living hinge" is integral to each hinging corner 28', 30', 32', 34' and each corner thus interconnects a respective pair of relatively rigid side panels 20', 22', 24', 26'. Wall support 19' is formed and integrally molded from reusable, durable material such as plastic which is capable of surviving a maximum of flexures at each living hinge. The wall support 19' of the second embodiment allows the interconnected wall panels to be washed after use, and stored in their folded position for future repeated use. The second embodiment may be preferred by some paint contractors because only one foldable wall support need be purchased thus saving both storage space and money.

In summary, it can be seen that the improved paint strainer assembly of the invention makes it possible to replace the strainer bag once clogged and to reuse the wall support in contrast to the '470 patent paint strainer which requires both the wall support and the strainer bag to be replaced anytime the strainer bag becomes clogged. Also, with the new paint strainer assembly of the invention, the strainer bag is not required to be permanently attached to the wall support during manufacture, is easily removed and replaced and in use maintains a neat appearance and avoids hazardous bunching and gathering of the bag as in the prior art.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A liquid paint strainer assembly for use in straining and depositing liquid paint in an open container having a top edge, comprising:
    (a) an upwardly extending closed wall support formed by a plurality of wall panels hingedly interconnected by elongate hinging portions, and having upper and lower edges defining respective upper and lower openings and a passageway interconnecting said openings;
    (b) means for removably attaching said wall support to the top edge of said container at said lower edge of said wall support;
    (c) a strainer bag formed of a mesh material and defining a tapered cross-section, a closed end and an upper perimeter edge defining an open end, said perimeter edge having an elasticized periphery portion surrounding and joined thereto enabling said open end to be contracted and expanded;
    (d) an open groove formed in said panels at each said hinging portion and uniformly spaced below said wall support upper edge thereby enabling the elasticized periphery portion of said strainer bag to be draped over the upper edge of said wall support and inserted into each said groove thereby to locate said periphery portion externally of said panels and said closed end of said strainer bag extending downwardly within said passage.

2. A liquid paint strainer assembly as recited in claim 1, wherein said strainer bag is formed from two mesh portions being interconnected at outer edges of said tapered cross-section to form a seam, and said perimeter edge has an upwardly angled shape.

3. A liquid paint strainer assembly as recited in claim 2, wherein said strainer bag is adapted to be mounted to said wall support such that said seam coincides with two of opposed said corners, so as to cause said convex perimeter edge to fit tightly to the exterior surface of said panels.

4. A liquid paint strainer assembly as recited in claim 1, wherein said wall support is formed with a plurality of living hinges interconnecting said wall panels, said wall support being made from a durable reusable material capable of surviving repeated flexures at said living hinges.

* * * * *